Patented Mar. 18, 1952

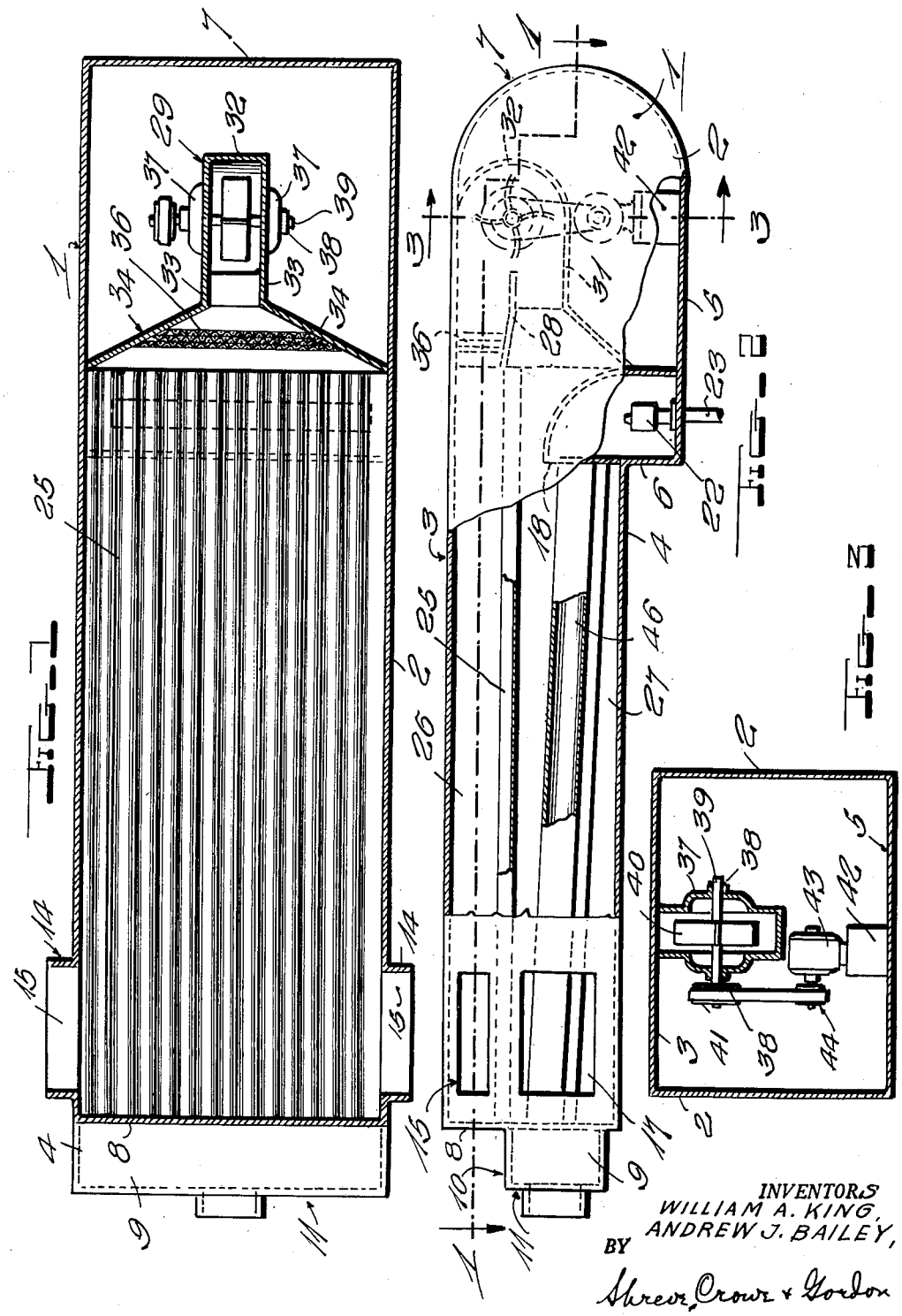

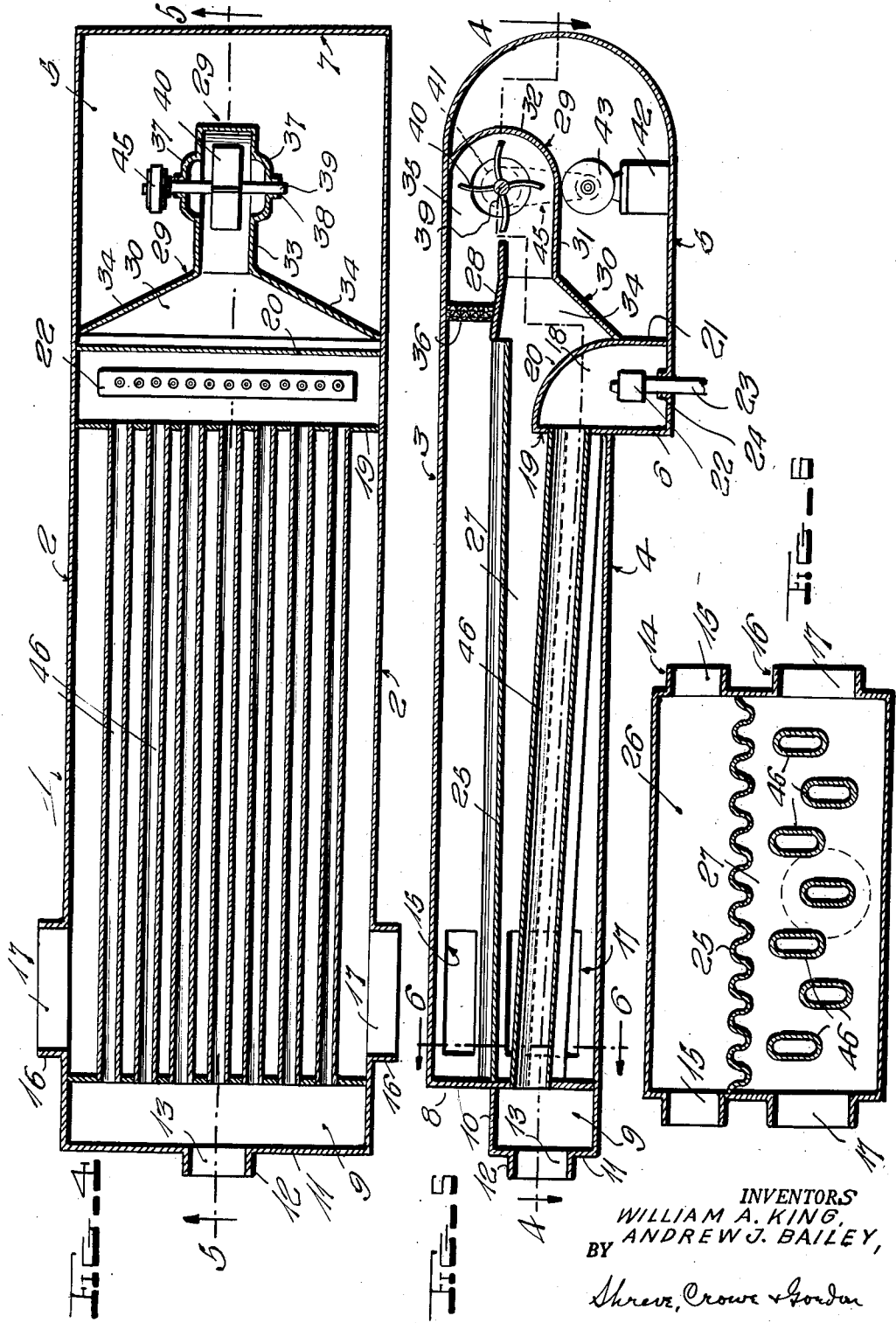

2,589,555

UNITED STATES PATENT OFFICE 2,589,555

HORIZONTAL FORCED AIR FLOW AIR-HEATING FURNACE

William A. King and Andrew J. Bailey, Atlanta, Ga.

Application November 22, 1946, Serial No. 711,660

4 Claims. (Cl. 126—110)

Generically this invention relates to furnaces, but it is more particularly directed to a suspendable hot air furnace.

One of the principal objects of this invention is the provision of a novel heat exchanger arranged with superimposed parallel cold air intake and heated air exhaust passages coextensive with each other, wherein the cold air is preheated during its intake travel and prior to its entrance into the heated exhaust passage.

Another important object of this invention is the provision of a compact horizontal suspendable hot air furnace having substantially coextensive cold air intake and hot air exhaust passages, means for effecting intake of the air through said cold air passage and exhaust of the air through the exhaust passage, said cold air during its intake travel adapted to be pre-heated from said exhaust passage, and means in said exhaust passage for additionally heating the air during its course of travel in exhaust direction therethrough.

A still further object of this invention is to the provision of a compact horizontal hot air furnace provided with a horizontally disposed partition wall extending substantially throughout its length and dividing said device into a cold air intake passage and an underlying hot air exhaust passage, said cold air passage at one end having an intake port and said exhaust passage having adjacent thereto an exhaust port, said exhaust passage communicating with a flue header, a combustion chamber in said exhaust passage and a series of flue tubes effecting communication between the combustion chamber and header, a plenum chamber interconnecting said intake and exhaust passages, and means in said chamber for directing the air from the intake passage to said exhaust passage and over said flue tubes, the arrangement of said passages and combustion chamber being such that the air traveling through said intake passage will be preheated and further heated during its travel through said exhaust passage.

Another important object of this invention is the provision of a heat exchanger arranged with co-extensive cold air intake and heated air exhaust passages and means for directing the air from the cold air intake to the exhaust passage and heating means in the exhaust passage, the arrangement of said heating means and passages being such that the cold air is pre-heated during its intake travel and additionally during its travel through the exhaust passage in discharging direction, and means in connection with said exhaust passage and in communication with a flue tending to prevent loss of heat from said exhaust passage through the flue.

With these and other objects in view, which will become apparent as the description proceeds, the invention resides in the construction, combination, and arrangement of parts, hereinafter more fully described and claimed, and illustrated in the accompanying drawings, in which like characters of reference indicate like parts through the several figures, of which:

Fig. 1 is a horizontal section of our improved hot air furnace device taken on the line 1—1 of Fig. 2.

Fig. 2 is a side elevation with parts broken away and in section.

Fig. 3 is a vertical transverse section taken on the line 3—3 of Fig. 2.

Fig. 4 is a horizontal longitudinal section taken on the line 4—4 of Fig. 5.

Fig. 5 is a longitudinal sectional view taken on the line 5—5 of Fig. 4 with parts in elevation.

Fig. 6 is a transverse cross section taken on the line 6—6 of Fig. 5.

Briefly this invention is directed to a compact hot air furnace adapted to be mounted horizontally against the floor joist or ceiling and suspendingly supported therefrom, thereby eliminating much of the deterioration from dampness as in connection with furnaces mounted on the ground or basement floor and reducing installation difficulties, said furnace including a parallel arrangement of cold and hot air passages interconnected by a plenum chamber, including a heating unit, and a fan mounted in said chamber, arranged in a manner such that the air is preheated while being drawn through said cold air passage to said chamber and is directed therefrom over said combustion chamber and means for directing the heated air from said hot air passage after it has been distributed over and around said flue tubes throughout the length of said passage.

In the illustrated embodiment characterizing this invention there is shown a substantially rectangular self-contained hot air furnace 1 comprising a casing or housing constructed of sheet metal or other suitable material, formed with sides 2, top 3, and bottom 4, formed with a downwardly offset bottom section 5 connected by the vertical wall section 6 and integrally connecting top 3 and bottom section 5 in a rear curved end wall 7. This construction forms an enlarged rear casing or body end portion of greater depth than the remaining portion of the casing. At the opposite end of the device or casing, top 3 and bottom 4 are connected by the end wall 8. The bottom 4 and sides 2 spaced downwardly from top 3 extends beyond end 8 to form the bottom and sides of the flue header 9 formed with top 10 and end 11. Said end 11 is formed with an annular flange 12 projecting beyond end 11 and forming a flue opening 13 communicating with said header. The side walls 2 adjacent top 3 and end 8 are formed with outwardly projecting rectangular flanges 14 forming cold air intake ports or ducts 15, and spaced downwardly from ducts 15 are the similar outwardly projecting flanges 16 forming enlarged rectangular hot air exhaust openings or ducts 17.

At the end of bottom 4 on bottom section 5 is the combustion chamber or fire box 18 formed by the vertical wall 19 and the outwardly and downwardly curved top portion 20 terminating in the vertical wall section 21, the ends of said sections being suitably secured to the sides 2 and bottom sections 4 and 5. Mounted in the combustion chamber 18 is a gas or liquid fuel heater 22 mounted on a fuel supply pipe or conduit 23 extending through bottom section 5 and boss 24 and suitably secured therein and connected to a source of fuel supply.

A horizontally disposed corrugated metal partition wall or member 25 with its edges welded or otherwise suitably secured to sides 2 and end 8 and extends from end 8 to a point substantially in alignment with rear wall portion 21 of combustion chamber 18 and forming the cold air intake passage 26 and the heating chamber or hot air passage 27. A substantially horizontal plate 28 abuts and is welded or suitably secured to the end of member 25 and sides 2, said plate being slightly inclined downwardly and outwardly forming a continuation of air passage 26.

A metallic casing structure 29 is formed with a downwardly projecting apron portion 30 secured at its lower edge to the upper end of wall portion 21 of combustion chamber 18. Said apron 30 extends upwardly and outwardly forming the bottom portion 31, the upwardly extending curved end portion 32, the parallel wall portions 33 and the laterally extending wall portions 34 suitably secured to sides 2, the upper edges of the remaining portions are welded or otherwise suitably secured to top 3 and forming the plenum chamber 35 in which projects member 28. Suitably mounted in air passage 26 and intermediate plate 28, top 3, and walls 34 is an air filter structure 36, as and for a purpose directly more fully appearing.

The plenum chamber 35 communicates with the cold air passage 26 and hot air passage 27. In the present instance the walls 33 adjacent the rounded end 32 are formed with outwardly projecting bulges 37 formed with bearing openings 38 in which is journaled shaft 39 on which is keyed or otherwise mounted fan 40. Mounted on one end of shaft 39 is pulley 41 and mounted on base 42 supported on and suitably secured to bottom section 5 is motor 43 having drive shaft pulley 44 connected to pulley 41 by belt 45 for driving fan 40. The shaft 39 which is in substantial horizontal alignment with the free end of plate 28 so that the cold or pre-heated air entering the plenum chamber 35 from passage 26, after passing through filter 36, will be directed downwardly and into passage 27 over combustion chamber 18 and from exhaust ducts 17 as will directly more fully appear.

A series of, in the present instance, eliptical flue tubes 46 are arranged in staggered relation in hot air heating chamber or exhaust passage 27 with one end extending through wall 19 and in communication with combustion chamber 18 and their other ends similarly extending through end wall 8, with their discharge ends in said wall 8 elevated with respect to their intake ends in wall 19, so as to overcome the draft and carry off the products of combustion from chamber 18 to header 9 from which they are discharged through the centrally positioned flue 13 to the stack (not shown). Such construction designed by reason of the flue header and heater to further increase the heat exchange and to retain in chamber or exhaust passage 27 much of the heat that would be otherwise lost through the stack.

The interior arrangement of the casing including the air intake ducts, at opposite sides of the casing, exhaust ports, and fan, is such as to effect an even distribution of the air as it is drawn in by the fan through the intake passage and exhausted through the exhaust passage, said air being pre-heated during its intake travel by the heated bottom of the intake passage overlying the heating chamber, and further heated during its travel through the heating passage and over the combustion chamber and over and around the flue tubes to the flue header. The corrugations of the common wall or partition 25 afford an increased heating area, and consequent increased pre-heating of the air distributed thereover during its intake travel, such construction affording a maximum heat exchange efficiency while at the same time effecting a saving in material and manufacturing costs by the elimination of the extensive baffle construction heretofore prevalent in hot air furnace construction, and enabling a compact arrangement adapted to occupy a minimum of space and reduction in weight.

It will be further noted that the construction of the plenum chamber including the wall portions and apron 30 is such as to effect an even distribution of the air over the combustion chamber throughout the exhaust passage and over the flue tubes as will be well understood. The instant furnace may be truly termed, an all-weather device, since it may be expeditiously converted from an air heating to an air cooling device, simply by the substitution of a cooling unit for the heating unit.

From the above it will be apparent that we have designed a hot air furnace adapted to be suspended in any well known manner from the joists or ceiling of a basement or room and from which the heated air may be directed to the area to be heated, said furnace being compact in form, simple in construction, comprising few parts, manufacturable and serviceable at a minimum cost, and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is desired to emphasize that various minor changes in details of construction, proportion and arrangement of parts, may be resorted to within the scope of the appended claims without departing from or sacrificing any of the principles of this invention.

Having thus described the invention, what is desired protected by Letters Patent is as set forth in the following claims:

1. In a heating structure, a casing adapted to be suspended from a support, said casing comprising a forward end wall, side walls, and horizontal top and bottom walls, a partition wall horizontally disposed between said side walls and in spaced relation with respect to said top and bottom walls and extending from said front wall rearwardly the greater portion of said casing and forming with said top wall a cold air intake passage and forming with said bottom wall a hot air exhaust passage, a cold air intake duct formed in said side wall at the forward end of said cold air passage and an underlying exhaust duct in communication with said exhaust passage, said bottom wall being formed with a downwardly offset and rearwardly extending bottom portion connected to said top wall by a rear end wall forming an enlarged casing end portion, a combustion chamber in said end portion extending within said exhaust passage, a series of flue tubes arranged in said exhaust passage in communication with said combustion chamber and extending through said forward end wall, a distributing chamber in communication with the rear ends of said air intake and exhaust passages and defined by top, bottom, side, and end walls, said bottom wall terminating in an apron extending downwardly to the combustion chamber, fan means in said distributing chamber for drawing cold air, preheated as it traverses said cold air passage, to said distributing chamber and moving it therefrom to and over said combustion chamber and through said exhaust passage and around and over said flue tubes to said exhaust port.

2. In a heating structure, a casing adapted to be suspended from a support, said casing comprising a forward end wall, side walls, and horizontal top and bottom walls, a corrugated partition wall horizontally disposed between said side walls and in spaced relation with respect to said top and bottom walls and extending from the front wall rearwardly forming with said top wall a cold air intake passage and forming with said bottom wall a hot air exhaust passage, a cold air intake duct formed in said side wall at the forward end of said cold air passage and an underlying exhaust duct in communication with said exhaust passage, said bottom wall being formed with a downwardly offset and rearwardly extending bottom portion connected to said top wall by a rear end wall forming an enlarged casing end portion, a combustion chamber in said end portion extending upwardly within said air passage and formed with an arcuate rearwardly extending top wall portion, a series of flue tubes arranged in said exhaust passage in communication with said combustion chamber extending through said forward end wall, a partition wall spaced from the rear end wall extending downwardly and forwardly and including an apron portion extending downwardly and intersecting the lower portion of said arcuate top portion of the combustion chamber, a distributing chamber in communication with the rear ends of said intake and exhaust passages and defined by top, bottom, side and end walls, said bottom and side walls intersecting, respectively, said apron and said last mentioned partition, a motor chamber underlying said distributing chamber, fan means in said distributing chamber and a motor in said motor chamber for driving said fan, the corrugations of said partition wall affording an increased heating area and consequent preheating of the air during its intake travel through said cold air passage to the distributing chamber, said apron means effecting distribution of the said preheated air as it is moved from said distributing chamber downwardly and over the arcuate wall of said combustion chamber, and then over and around said flue tubes throughout their length to be further heated and discharged from the exhaust port.

3. In a heating structure, an elongated casing adapted to be suspended from a support, said casing comprising a forward end wall, side walls, and horizontal top and bottom walls, a partition wall horizontally disposed between said side walls in spaced relation with said top and bottom walls and extending from the front wall rearwardly and forming with said top wall a cold air intake passage and forming with said bottom wall a hot air exhaust passage, opposite cold air intake ducts formed in said side walls at the forward end of said cold air passage and corresponding underlying exhaust ducts in communication with said exhaust passage, said bottom wall being formed with a downwardly offset and rearwardly extending bottom portion connected to said top wall by a rear end wall forming an enlarged casing end portion, a combustion chamber in said end portion extending within said exhaust passage, a series of flue tubes arranged in said exhaust passage in communication with said combustion chamber and extending through said forward end wall, a distributing chamber in said enlarged end portion in communication with the rear ends of said air intake and exhaust passages and defined by top, bottom, side, and end walls, said bottom wall terminating in a downwardly extending apron portion intersecting the rear wall of said combustion chamber, fan means in said distributing chamber for drawing cold air through said intake ducts, preheated as it traverses said passage to said distributing chamber, and moving it therefrom directed by said apron over said combustion chamber, and thence through said exhaust passage around and over said flue tubes to said exhaust ports, and a header formed with a stack flue exit integrally formed by said side walls in communication with the ends of the flue tubes extending through said forward end wall, said flue tubes being disposed upwardly and at an angle from said combustion chamber, such construction adapted to retain in said exhaust passage a portion of the heat that would otherwise be lost through the stack.

4. In a heating structure, a casing adapted to be suspended from a support, said casing comprising horizontal top and bottom walls, side walls, and front and rear end walls, a partition wall horizontally disposed between said side walls in spaced relation with said top and bottom walls and extending rearwardly from said front wall the greater portion of said casing and forming with said top wall a cold air intake passage and with said bottom wall a hot air exhaust passage, a cold air intake duct formed in said side wall at the forward end of the cold air passage, and an underlying exhaust duct in communication with said exhaust passage, a combustion chamber extending within the rear end of said exhaust passage, a series of flue tubes arranged in said exhaust passage in communication with said combustion chamber and extending through said front end wall, a distributing chamber in communication with the rear ends of said air intake and exhaust passages and defined by top, bottom, side and end walls, said bottom terminating in an apron extending downwardly to the combustion chamber, fan means in said distributing chamber for drawing cold air, preheated as it traverses said cold air passage, to said distributing chamber and moving it therefrom to and over the combustion chamber and through said exhaust passage and around and over said flue tubes to said exhaust port.

WILLIAM A. KING.
ANDREW J. BAILEY.

REFERENCES CITED

The following references are of record in the file of this patent:

UNITED STATES PATENTS

| Number    | Name     | Date           |
|-----------|----------|----------------|
| 1,579,599 | DeForest | Apr. 6, 1926   |
| 2,022,237 | Grant    | Nov. 26, 1935  |
| 2,072,517 | Gille    | Mar. 2, 1937   |
| 2,109,876 | Bard     | Mar. 1, 1938   |
| 2,130,630 | Kolstad  | Sept. 20, 1938 |
| 2,259,187 | Turnbull | Oct. 14, 1941  |